L. A. CORNELIUS.
FLOAT VALVE FOR TANKS.
APPLICATION FILED MAR. 18, 1909.
1,041,746.
Patented Oct. 22, 1912.
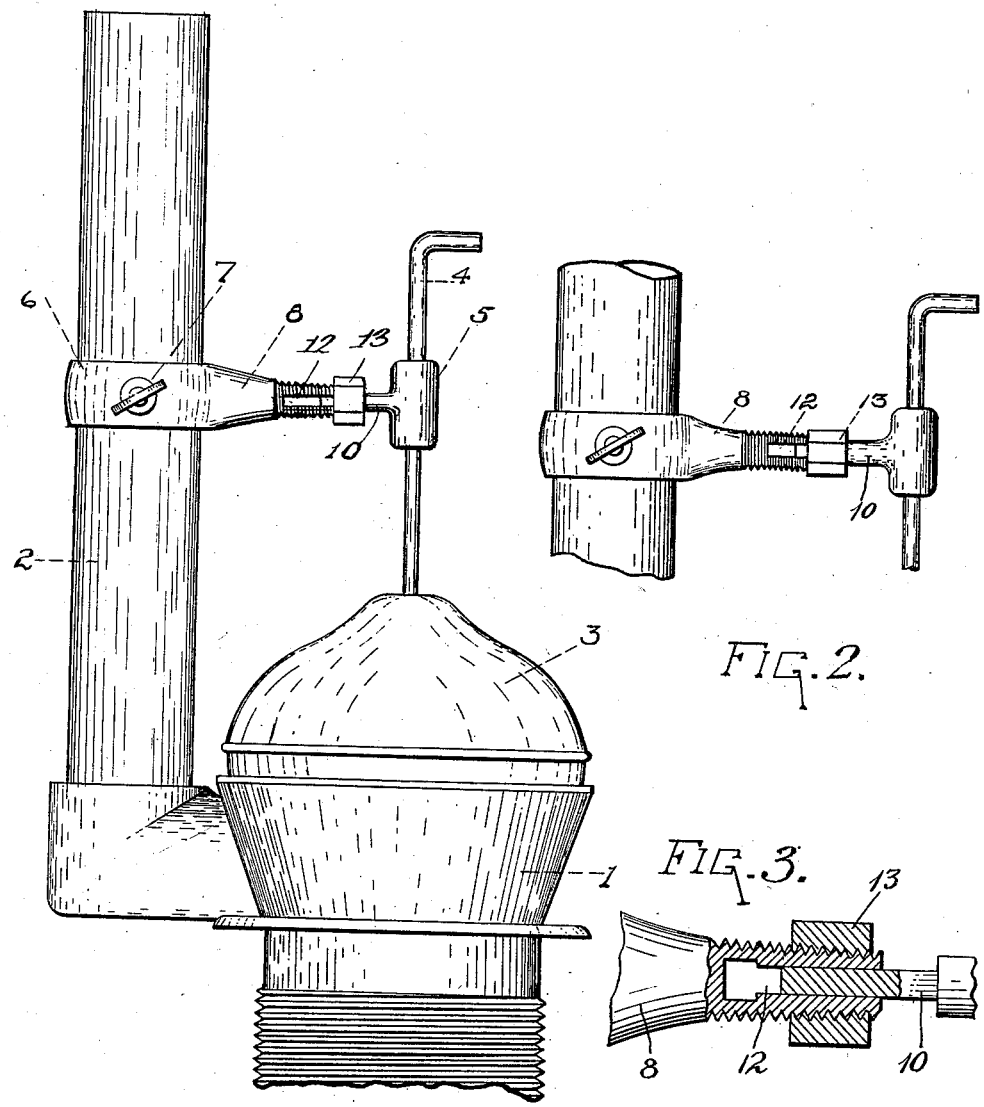
WITNESSES:
INVENTOR.
Louis A. Cornelius
BY
Edward Taggart ATTORNEY.

UNITED STATES PATENT OFFICE.

LOUIS A. CORNELIUS, OF GRAND RAPIDS, MICHIGAN.

FLOAT-VALVE FOR TANKS.

1,041,746.     Specification of Letters Patent.     Patented Oct. 22, 1912.

Application filed March 18, 1909. Serial No. 484,317.

*To all whom it may concern:*

Be it known that I, LOUIS A. CORNELIUS, a citizen of the United States, residing at Grand Rapids, in the county of Kent and State of Michigan, have invented new and useful Improvements in Float - Valves for Tanks, of which the following is a specification.

In closet tanks, or other tanks, which it is desired should be emptied by a valve which will open and automatically remain open until the tank is empty, it is customary to accomplish this purpose by using a bulb of rubber, or other material buoyant enough so that it will float upon the water normally, but of such construction that the suction effect will seat it and hold it seated until some force is exerted to remove it from the seat, whereupon it will rise to the top of the water, or as far as mechanical limitations permit, and remain buoyant in the water until it is again seated by what is spoken of as the suction effect. The proper assembling of this valve float and its related parts in connection with the other parts of the mechanism, and the proper adjustment of the same, present difficulties which it is the especial object of this invention to minimize; although the construction may be used in connection with valves of other types. Such a valve is lifted by a rod acting as a valve stem, and some suitable guide for such valve stem should be adjusted directly over the point of seating, since, if the valve does not rise and fall vertically, it will not seat properly. Different means of thus properly adjusting and holding the valve stem have been used, but I find the means here shown to be particularly economical and efficient.

In the accompanying drawings, Figure 1 is a side view of my device completely assembled. Fig. 2 is a side view of parts somewhat enlarged; and Fig. 3 is a vertical longitudinal section of the parts shown in Fig. 2.

In these drawings 1 is the valve casting or seat of usual construction.

2 is the overflow or waste pipe communicating with the escape pipe in the usual way.

3 is any customary or suitable form of bulb or float valve having a valve stem 4 which slides in and is guided by the sleeve or guide 5. The valve stem 4 is lifted by mechanism of the usual construction which is not a part of this invention and which I have not shown.

6 is a sleeve surrounding the overflow pipe 2 and adjustable thereon vertically and in the plane of a horizontal circle. It is clamped at any desired point by suitable means, as by the set screw 7. This sleeve is extended on one side into a hollow projection 8, exteriorly threaded and divided into longitudinal tongues by one or more slots 12.

The sleeve 5 is provided with an extension or stem 10 adapted to snugly fit between the tongues and to be clamped by the tongues by turning the nut 13, slightly tapered upon its interior and threaded on the extension 8.

To adjust the parts to the position of the valve seat, the sleeve 6 is properly positioned vertically and turned on the pipe 2 and then clamped by the screw 7 and the stem 10 is slid into proper position between the tongues and clamped therein by turning the nut 13.

I claim:

1. The combination of the valve seat, the valve, a stem therefor, a sleeve for such stem, means for supporting such sleeve in connection with the valve seat, a stem projecting from such sleeve, a hollow chamber in connection with the supporting means, slots in the walls of such hollow chamber and a nut having a taper thread,—whereby the stem may be adjusted in such hollow chamber and clamped in any desired adjustment.

2. In a device of the character described, the combination of a valve having a stem, a valve seat for the valve, a bearing-member for the valve stem, and means for adjustably holding the bearing-member relatively to the valve seat comprising a supporting member having tongues adapted to adjustably hold the bearing-member between them, and a nut taperingly screw-threaded on the tongues and adapted when turned to its operative position to clamp the tongues on the bearing-member.

In testimony whereof I have hereunto set my hand in presence of two subscribing witnesses.

LOUIS A. CORNELIUS.

Witnesses:
A. C. DENISON,
MARY S. TOOKER.

Copies of this patent may be obtained for five cents each, by addressing the "Commissioner of Patents, Washington, D. C."